United States Patent
Xie et al.

(10) Patent No.: US 11,695,320 B2
(45) Date of Patent: Jul. 4, 2023

(54) ADAPTIVE GAIN AND BANDWIDTH RAMP GENERATOR

(71) Applicant: TEXAS INSTRUMENTS INCORPORATED, Dallas, TX (US)

(72) Inventors: Zhangyi Xie, Shanghai (CN); Neil Gibson, Freising (DE); Stefan Herzer, Marzling (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 273 days.

(21) Appl. No.: 17/214,527

(22) Filed: Mar. 26, 2021

(65) Prior Publication Data

US 2022/0158537 A1 May 19, 2022

Related U.S. Application Data

(63) Continuation of application No. PCT/CN2020/129326, filed on Nov. 17, 2020.

(30) Foreign Application Priority Data

Nov. 17, 2020 (WO) ................ PCT/CN2020/129326

(51) Int. Cl.
*H02M 3/158* (2006.01)
*H02M 1/00* (2006.01)
*H02M 1/08* (2006.01)

(52) U.S. Cl.
CPC ....... *H02M 1/0087* (2021.05); *H02M 1/0025* (2021.05); *H02M 1/08* (2013.01); *H02M 3/158* (2013.01); *H02M 1/0003* (2021.05); *H02M 1/0083* (2021.05)

(58) Field of Classification Search
None
See application file for complete search history.

(56) References Cited

U.S. PATENT DOCUMENTS

| 6,066,943 | A | 5/2000 | Hastings et al. |
| 6,127,814 | A * | 10/2000 | Goder ................. H02M 3/1588 323/282 |
| 7,259,603 | B2 | 4/2007 | Gibson et al. |
| 9,755,519 | B1 * | 9/2017 | Huang ................ H03K 17/687 |

(Continued)

FOREIGN PATENT DOCUMENTS

CN 208971371 U 6/2019

OTHER PUBLICATIONS

International Search Report dated Aug. 25, 2021.

*Primary Examiner* — Matthew V Nguyen
(74) *Attorney, Agent, or Firm* — Charles F. Koch; Frank D. Cimino

(57) ABSTRACT

In some examples, a circuit includes a resistor network, a filter, a current generator, and a capacitor. The resistor network has a resistor network output and is adapted to be coupled between a switch terminal of a power converter (104) and a ground terminal. The filter has a filter input and a filter output, the filter input coupled to the resistor network output. The current generator has a current generator output and first and second current generator inputs, the first current generator input configured to receive an input voltage and the second current generator input coupled to the filter output. The capacitor is coupled between the current generator output and the ground terminal.

20 Claims, 4 Drawing Sheets

(56) References Cited

U.S. PATENT DOCUMENTS

| | | | | |
|---|---|---|---|---|
| 2010/0045247 A1* | 2/2010 | Blanken | ................ | H03F 3/211 |
| | | | | 323/273 |
| 2011/0031948 A1 | 2/2011 | Chien et al. | | |
| 2014/0049235 A1* | 2/2014 | Li | ........................ | G05F 1/46 |
| | | | | 323/271 |
| 2014/0210441 A1* | 7/2014 | Mao | .................... | H02M 3/156 |
| | | | | 323/282 |
| 2014/0292300 A1 | 10/2014 | Yan et al. | | |
| 2019/0149107 A1 | 5/2019 | He et al. | | |

\* cited by examiner ized gain and/or bandwidth.

ADAPTIVE GAIN AND BANDWIDTH RAMP GENERATOR

CROSS-REFERENCE TO RELATED APPLICATION

This application is a continuation of international Patent Application No. PCT/CN2020/129326 filed Nov. 17, 2020, which is incorporated herein by reference.

BACKGROUND

Certain circuits use feedback for operation. Often, this feedback is conventionally provided by a feedback resistor network to create a feedback voltage. However, the feedback resistor network can sometimes adversely affect operation of the circuits utilizing the feedback for operation.

SUMMARY

In some examples, a circuit includes a resistor network, a filter, a current generator, and a capacitor. The resistor network has a resistor network output and is adapted to be coupled between a switch terminal of a power converter and a ground terminal. The filter has a filter input and a filter output, the filter input coupled to the resistor network output. The current generator has a current generator output and first and second current generator inputs, the first current generator input configured to receive an input voltage and the second current generator input coupled to the filter output. The capacitor is coupled between the current generator output and the ground terminal.

In at least some examples, a circuit includes a filter, a current generator, and a capacitor. The filter is configured to receive a signal representative of an output of a power converter and extract direct-current information from the signal representative of the output of the power converter to provide a filtered signal. The current generator is configured to receive an input voltage of the power converter, receive the filtered signal, and provide a ramp current based on the input voltage of the power converter and the filtered signal. The capacitor is configured to provide a ramp voltage based on charging and discharging according to the ramp current.

In at least some examples, a circuit includes a battery, a filter, a current generator, and a capacitor. The battery is configured to provide a battery voltage. The filter is configured to receive a signal representative of an output of a power converter and attenuate high-frequency components of the signal representative of the output of the power converter to provide a filtered signal. The current generator is configured to provide a ramp current based on the battery voltage and the filtered signal. The capacitor is configured to provide a ramp voltage based on charging and discharging according to the ramp current.

DETAILED DESCRIPTION

Figure 1:
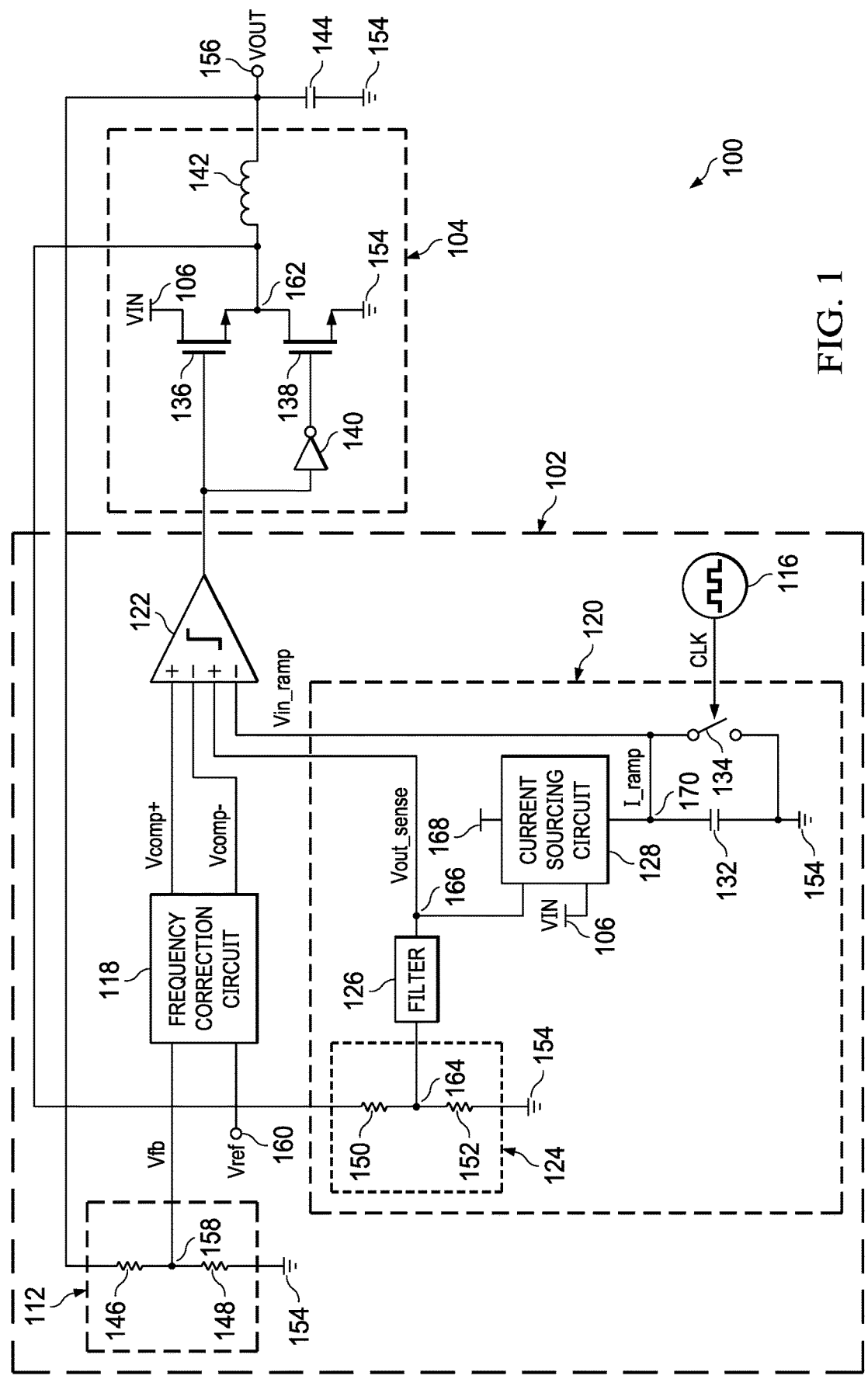
FIG. 1 is a block diagram of an example switched mode power supply (SMPS) in accordance with various examples.

Some conventional voltage mode and/or current mode power converter implementations use a feedback resistor network to provide a feedback voltage (Vfb) that is representative of an output voltage of the power converter. Vfb is used, in some implementations, along with a reference voltage (Vref) to set a target output voltage for the power converter. However, the feedback resistor network can, in at least some implementations, adversely affect operation of the power converter. For example, in at least some implementations the feedback resistor network causes a reduction in broadband gain of the power converter and/or in bandwidth of the power converter. The reduction in gain and/or in bandwidth can, in some circumstances, limit transient performance of a load coupled to the power converter, create challenges in implementing frequency compensation of the power converter, and hinder the use of at least some power converters in markets specifying larger input voltage (Vin) ranges and/or output voltage (Vout) ranges for power converters to be considered suitable in those markets.

Some conventional approaches to mitigating the reduction in gain and/or bandwidth associated with a feedback resistor network include coupling a feedforward capacitor across a top resistor of the feedback resistor network. As a capacitance of the feedforward capacitor increases, the reduction in gain and/or bandwidth associated with a feedback resistor network is further mitigated (e.g., the gain and/or bandwidth losses are further recovered). However, as the feedforward capacitor increases in capacitance, it also increases in physical size. As a capacitor increases in size, it increases in both component cost (e.g., cost of the feedforward capacitor itself) and implementation cost (e.g., cost resulting from increased space consumed by the feedforward capacitor). Furthermore, the feedforward capacitor often cannot adapt rapidly to a changing Vout in real-time.

As described herein, a circuit modifies an effective slope of a ramp signal (Vin_ramp) used in operation of a power converter. Vin_ramp, in at least some examples, is used in generating or providing a control signal for controlling one or more active switching components, such as transistors, of the power converter. In at least some examples, Vin_ramp is proportional to Vin (and in some examples is provided based on Vin) and is modified based on a signal (Vout_sense) that is derived from the power converter in an on-going and substantially real-time manner. In at least some examples, the modification of the effective slope of Vin_ramp based on Vout_sense mitigates the gain and/or bandwidth loss associated with use of the feedback resistor network to provide Vfb. For example, by modifying the effective slope of Vin_ramp, the circuit experiences a lesser reduction in gain and/or bandwidth than if the circuit instead used a feedforward capacitor as in the conventional approaches or took no action to mitigate the gain and/or bandwidth loss associated with use of the feedback resistor network.

In at least some examples, the circuit includes a filter, such as a low-pass filter, that provides Vout_sense based on a signal that exists at a node of the power converter. For example, in some implementations, a resistor network is coupled between a switch node of the power converter and a ground node. A signal that exists at the switch node, in at least some examples, is representative of Vout. In such implementations, the filter has an input coupled to an output of the resistor network, where Vout_sense exists at an output of the filter. The circuit further includes a mathematics circuit that receives Vin and Vout_sense and provides a control signal for controlling a current source. The current source, in some examples, is a voltage-controlled current source that sources current to a capacitor. The capacitor is, in some examples, a ramp capacitor such that a voltage of the capacitor is Vin_ramp. A top plate of the capacitor is coupled, in some examples, to the ground node via a switch to facilitate discharge or resetting of the capacitor. The switch is controlled, in at least some implementations, by a clock signal. The clock signal is, in some examples, provided by an oscillator or any other suitable clock generation circuit.

FIG. 1 shows a block diagram of an example switched mode power supply (SMPS) 100. In at least one example, the SMPS 100 includes a controller 102 and a power converter 104. The SMPS 100, at least through the power converter 104, switches power provided based on a power source 106 to a node 156. In some examples, the power converter 104 is a buck power converter that operates according to a pulse width modulation (PWM) signal. The SMPS 100 of this description is shown and described as implementing voltage mode control, via the controller 102, over the power converter 104. However, other control methods are possible.

In at least one example, the controller 102 includes, or is adapted to be coupled to, a feedback circuit 112, an oscillator 116, a frequency correction circuit 118, a ramp generator 120, and a comparator 122. The ramp generator 120, in some examples, includes a resistor network 124, a filter 126, a current sourcing circuit 128, a capacitor 132, and a switch 134. The power converter 104, in at least some examples, includes a transistor 136, a transistor 138, an inverter circuit 140, and includes, or is adapted to be coupled to, an inductor 142 and, in some examples, a capacitor 144. In at least one example, the feedback circuit 112 includes a resistor 146 and a resistor 148. Similarly, the resistor network 124 includes a resistor 150 and a resistor 152.

At least one example of the SMPS 100 includes at least some aspects of the controller 102 and at least some aspects of the power converter 104 on a same semiconductor die and/or in a same component package, while in other examples components of the controller 102 and/or the power converter 104 may be fabricated separately and/or configured or adapted to be coupled together. For example, at least some aspects of the controller 102 may be fabricated separately and coupled together. Also, while not shown as including a gate driver, in at least one example the controller 102 and the power converter 104 are adapted to be coupled to a gate driver. Similarly, other components shown as being included in the controller 102 may instead be adapted to be coupled, in whole or in part, to the controller 102 and not be included on a same semiconductor die and/or in a same component package as the controller 102.

In at least one example architecture of the SMPS 100, the feedback circuit 112 is coupled between the node 156, at which Vout exists, and a ground node 154. For example, the resistor 146 is coupled between the node 156 and a node 158, and the resistor 148 is coupled between the node 158 and the ground node 154. In at least some implementations, Vfb exists at the node 158. The frequency correction circuit 118 has a first input (e.g., a positive or non-inverting input) coupled to the node 158 and a second input (e.g., a negative or inverting input) coupled to a node 160 and configured to receive Vref. The comparator 122 is, in some examples, a summing comparator. A summing comparator provides a logical high signal based on a voltage sum of input signals received by the summing comparator being zero or greater (e.g., non-negative) and provides a logical low signal based on the sum of the input signals received by the summing comparator being negative. In this way, the summing comparator determines a difference between each received input pair (such as a difference between a first input and second input, a difference between a third input and fourth input, a difference between a fifth input and sixth input, etc.). The summing comparator then determines a sum of those differences and provides an output signal based on that sum. In at least some examples, the comparator 122 includes a tail current source (not shown), such as a voltage controlled current source, associated with each pair of differential inputs of the comparator 122. By modifying a ratio of currents provided by the tail current sources for a differential input pair of the comparator 122, a gain ratio of the comparator 122 is modified. Modifying the gain ratio of the comparator 122, in at least some examples, at least partially compensates for, or mitigates, the broadband gain loss described herein.

In at least some examples, the comparator 122 includes a first input (e.g., a positive or non-inverting input) coupled to a first output (e.g., a positive or non-inverting output) of the frequency correction circuit 118 and a second input (e.g., a negative or inverting input) coupled to a second output (e.g., a negative or inverting output) of the frequency correction circuit 118. A positive component of a compensation signal (Vcomp+) exists at the first output of the frequency correction circuit 118, and a negative component of the compensation signal (Vcomp−) exists at the second output of the frequency correction circuit 118. An output of the comparator 122 is coupled, or adapted to be coupled, to a gate of the transistor 136 and an input of the inverter circuit 140. An output of the inverter circuit 140 is coupled to a gate of the transistor 138. A drain of the transistor 136 is coupled to the power source 106 and configured to receive Vin from the power source 106. A source of the transistor 136 is coupled to a node 162. A drain of the transistor 138 is coupled to the node 162, and a source of the transistor 138 is coupled to the ground node 154. In at least some examples, the power converter 104 is adapted to be coupled to the inductor 142 between the node 162 and the node 156. In some examples, the power converter 104 is further adapted to be coupled to a capacitor 144 between the node 156 and the ground node 154.

In at least some examples, the resistor network 124 is coupled between the node 162 and the ground node 154. For example, the resistor 150 is coupled between the node 162, and a node 164 and the resistor 152 is coupled between the node 164 and the ground node 154. The filter 126 has an input coupled to the node 164 and an output coupled to a node 166 at which Vout_sense exists. The current sourcing circuit 128 has a first input coupled to the power source 106 and configured to receive Vin, and a second input coupled to the node 166. An output of the current sourcing circuit 128 is coupled to a node 170. The current sourcing circuit 128 is configured to source current from a voltage supply 168 to the node 170, at which Vin_ramp exists, based on Vin and Vout_sense. The voltage supply 168, in some examples, is the power source 106. In other examples, the voltage supply 168 is a circuit that derives a supply voltage for powering the current sourcing circuit 128 from the power source 106. The capacitor 132 is coupled between the node 170 and the ground node 154. The switch 134 is coupled between the node 170 and the ground node 154. The oscillator 116 has an output coupled to the switch 134 such that a value of a clock signal output by the oscillator 116 controls the switch 134. The oscillator 116, in at least some examples, is any component or components suitable for generating or providing a clock signal, shown in FIG. 1 as CLK. A third input (e.g., a positive or non-inverting input) of the comparator 122 is coupled to the node 166, and a fourth input (e.g., a negative or inverting input) of the comparator 122 is coupled to the node 170. In at least some examples, Vin_ramp is provided by charging and resetting (e.g., discharging) the capacitor 132 at a rate of charge specified by a value of a current, indicated in FIG. 1 as I_ramp provided by the current sourcing circuit 128.

In at least one example, the SMPS 100 is configured to receive Vin from the power source 106 and provide Vout at the node 156 for supplying a load (not shown) coupled to the node 156. The SMPS 100 provides Vout by switching the transistor 136 and/or the transistor 138 or other switching elements (not shown) coupled through the node 162 (e.g., a switch node) to the inductor 142 or another energy storage element, which is capable of coupling to the load. Vout is based at least partially on Vin as provided by the power source 106 and Vref as received by the SMPS 100 at the node 160. Vref may be received from any suitable device (not shown) such as a processor, microcontroller, voltage source, reference circuit, or any other device, component, or circuit exerting control over the SMPS 100 to control a value of Vout.

The ramp generator 120 provides Vin_ramp to be proportional to Vin, modified according to Vout_sense. Modifying the charging current from Vin according to Vout_sense to provide Vin_ramp, in at least some examples, at least partially compensates the SMPS 100 for gain and/or bandwidth shrink or loss resulting from the feedback circuit 112. The resistor network 124 senses a signal that exists at the node 162 and provides a signal at the node 164 that is an output of the resistor network 124. The filter 126 filters the output of the resistor network 124 to provide Vout_sense at the node 166. In at least some examples, the filter 126 is a low-pass filter that filters high-frequency components from the output of the resistor network 124, leaving low-frequency components of the output of the resistor network 124 as Vout_sense. The current sourcing circuit 128 sources current to the node 170 based on Vin and Vout_sense. In some examples, an amount of current sourced by the current sourcing circuit 128 to the node 170 is determined by modifying Vin by Vout_sense. In some implementations, the modification is a subtraction of Vout_sense from Vin. In other implementations, the modification is a division of Vin by Vout_sense. In yet other examples, the modification is performed according to any suitable function implemented by the current sourcing circuit 128. Based on a result of the modification, the current sourcing circuit 128 sources current to the node 170. Based on the current sourced to the node 170 while the switch 134 is open, the capacitor 132 charges. A voltage of the capacitor 132 is Vin_ramp. Responsive to the switch 134 closing, the capacitor 132 discharges to the ground node 154, resetting Vin_ramp. The switch 134 may be any suitable component such as a transistor or a hardware (e.g., mechanical) switch.

The frequency correction circuit 118 provides Vcomp+ and Vcomp− based on Vfb and Vref. The frequency correction circuit 118 may be any suitable circuit including any suitable components. In at least one example, the frequency correction circuit 118 includes an integrator or error amplifier to perform low-frequency error correction and a zero-pole pair amplifier to perform high-frequency correction.

Figure 2:
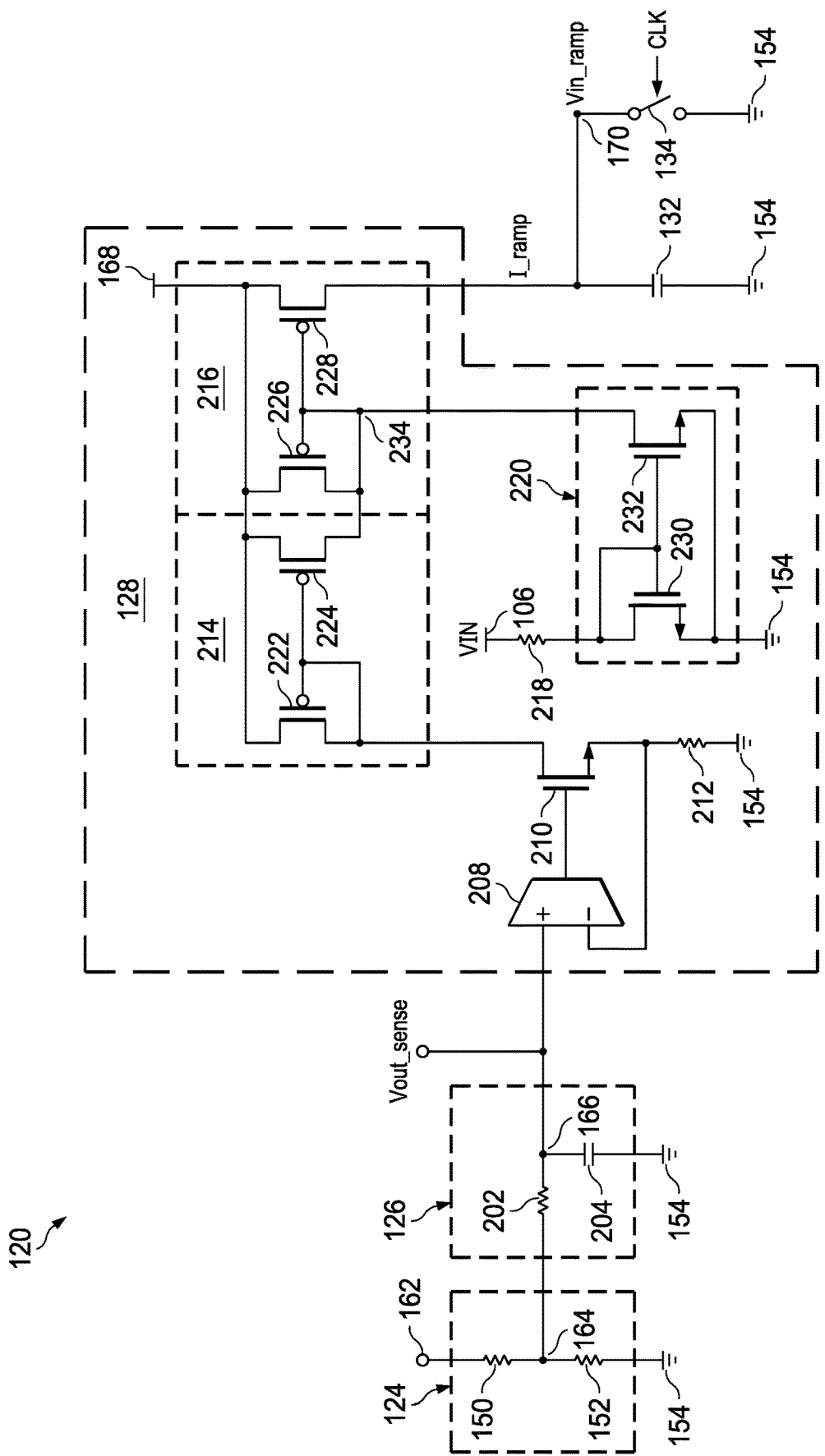
FIG. 2 is a schematic diagram of an example ramp generator in accordance with various examples.

FIG. 2 shows a schematic diagram of an example ramp generator 120. As described above with respect to FIG. 1, in at least some examples the ramp generator 120 includes a resistor network 124 that includes a resistor 150 and a resistor 152, a filter 126, a current sourcing circuit 128, a capacitor 132, and a switch 134. The filter 126, in at least some examples, includes a resistor 202 and a capacitor 204. The filter 126 as shown in FIG. 2 is a single-stage filter (e.g., the filter 126 includes a single resistor-capacitor (RC) pair). However, in other examples the filter 126 may be a multi-stage filter, such as having two stages, three stages, four stages, etc. The current sourcing circuit 128, in at least some examples, includes a transconductance amplifier 208, a transistor 210, a resistor 212, a current mirror 214, a current mirror 216, a resistor 218, and a current mirror 220. The current mirror 214, in at least some examples, includes a transistor 222 and a transistor 224. The current mirror 216, in at least some examples, includes a transistor 226 and a transistor 228. The current mirror 220, in at least some examples, includes a transistor 230 and a transistor 232.

In at least one example architecture of the ramp generator 120, the resistor network 124 is coupled between the node 162 and the ground node 154 such that the resistor 150 is coupled between the node 162 and the node 164, and the resistor 152 is coupled between the node 164 and the ground node 154. The filter 126 has a filter input coupled to the node 164 and a filter output coupled to the node 166 such that the resistor 202 is coupled between the node 164 and the node 166, and the capacitor 204 is coupled between the node 166 and the ground node 154. The transconductance amplifier 208 has a first amplifier input (e.g., a positive or non-inverting input) coupled to the node 166 and a second amplifier input (e.g., a negative or inverting input). The transconductance amplifier 208 further has an amplifier output coupled to a gate of the transistor 210. The transistor 210 has a source coupled to the second amplifier input and coupled through the resistor 212 to the ground node 154. The transistor 210 further has a drain coupled to a drain of the transistor 222, a gate of the transistor 222, and a gate of the transistor 224. The transistor 222, the transistor 224, the transistor 226, and the transistor 228 each have sources coupled to the voltage supply 168. The transistor 224 has a drain coupled to a node 234. The transistor 226 has a drain and a gate, each coupled to the node 234. The transistor 228 has a gate coupled to the node 234 and a drain coupled to the node 170. The transistor 230 has a drain and a gate coupled through the resistor 218 to the power source 106. The transistor 230 further has a source coupled to the ground node 154. The transistor 232 has a gate coupled through the resistor 218 to the power source 106, a source coupled to the ground node 154, and a drain coupled to the node 234. As described above, the capacitor 132 is coupled between the node 170 and the ground node 154, the switch 134 is coupled between the node 170 and the ground node 154 and configured to receive and be controlled by a clock signal, such as from the oscillator 116.

In an example of operation of the ramp generator 120, a signal exists at the node 162 and is representative of, or proportional to, an output voltage of a power converter such as the power converter 104. The resistor network 124 scales the signal that exists at the node 162 based on a relationship between resistances of the resistor 150 and the resistor 152, and the filter 126 filters the scaled signal formed by the resistor network 124. In at least some examples, the filter 126 filters the scaled signal to attenuate (e.g., filter out) high-frequency components of the scaled signal, extracting direct-current (DC) information from the scaled signal as Vout_sense. As used herein, high-frequency components of the scaled signal refer to components of the scaled signal having a frequency greater than a corner frequency of the filter 126. The corner frequency of the filter 126 is determined at least partially according to a value of components from which the filter 126 is constructed (such as resistance values of resistors, capacitance values of capacitors, inductance of inductors, etc.). In at least some examples, that DC information (e.g., Vout_sense) is indicative of a value of Vout and is provided by the ramp generator 120.

The transconductance amplifier 208 receives Vout_sense and provides an output signal having a current proportional to Vout_sense. In at least some examples, the transconductance amplifier 208 converts Vout_sense from a voltage to a current, such that where a voltage of Vout_sense was indicative of a value of Vout, a current of the output signal of the transconductance amplifier 208 becomes indicative of the value of Vout. Based on the output signal of the transconductance amplifier 208, the transistor 210 conducts current between its drain and source terminals such that a current representative of Vout_sense is mirrored by the current mirror 214 to exist at the node 234. The current mirror 220 similarly mirrors a current representative of Vin to the node 234. Current summing at the node 234 results in the current representative of Vout_sense being subtracted from the current representative of Vin at the node 234. The current mirror 216 mirrors the current existing at the node 234 to the node 170 as I_ramp.

Based on I_ramp, while the switch 134 is open, the capacitor 132 charges. A voltage of the capacitor 132 is Vin_ramp and is provided by the ramp generator 120. Responsive to the switch 134 closing, the capacitor 132 discharges to the ground node 154, resetting Vin_ramp. The switch 134 may be any suitable component such as a transistor or a hardware (e.g., mechanical) switch.

Figure 3:
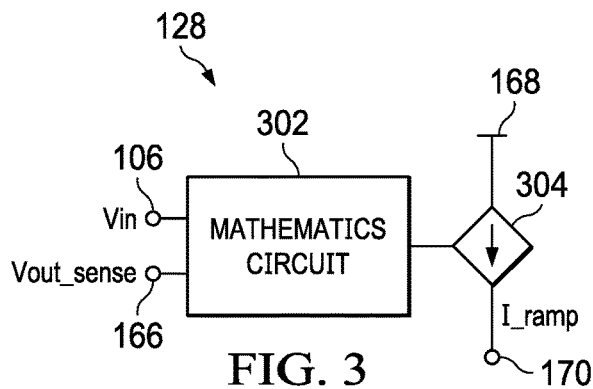
FIG. 3 is a schematic diagram of an example current sourcing circuit in accordance with various examples.

FIG. 3 shows a schematic diagram of an example current sourcing circuit 128. In at least some examples, the current sourcing circuit 128 includes a mathematics circuit 302 and a current source 304. The mathematics circuit 302 receives Vin and Vout_sense. An output of the mathematics circuit 302 is coupled to a control input of the current source 304 and configured to provide a control signal to the current source 304. The current source 304 is coupled between the voltage supply 168 and the node 170 such that the current source 304 sources current from the voltage supply 168 to the node 170. In at least some examples, the current provided by the current source 304 is I_ramp and is proportional to the control signal provided by the mathematics circuit 302.

The mathematics circuit 302 is configured to perform one or more operations or functions utilizing Vin and Vout_sense as inputs. For example, in some implementations, the mathematics circuit 302 subtracts Vout_sense from Vin to provide the control signal. In other implementations, the mathematics circuit 302 divides Vin by Vout_sense to provide the control signal. In yet other examples, the mathematics circuit 302 performs any one or more mathematical or logical functions based on Vin and Vout_sense to provide the control signal. The control signal, in at least some examples, is provided by the mathematics circuit 302 to the current source 304 to control a value of the current sourced by the current source 304 to the node 170 as I_ramp.

Figure 4:
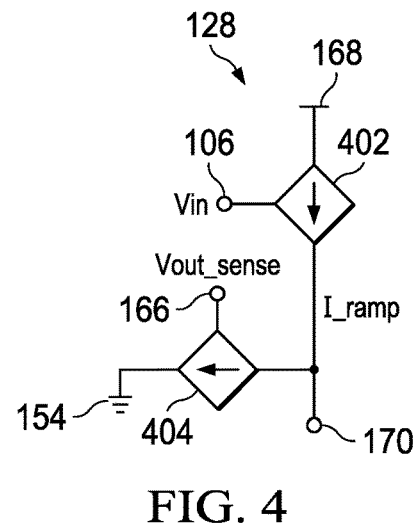
FIG. 4 is a schematic diagram of an example current sourcing circuit in accordance with various examples.

FIG. 4 shows a schematic diagram of an example current sourcing circuit 128. In at least some examples, the current sourcing circuit 128 includes a current source 402 and a current source 404. The current source 402 is coupled between the voltage supply 168 and the node 170. The current source 404 is coupled between the node 170 and the ground node 154. In at least some examples, the current source 402 is configured to receive and be controlled by Vin. Similarly, in at least some examples, the current source 404 is configured to receive and be controlled by Vout_sense.

The current source 402 sources current from the voltage supply 168 to the node 170. The current source 404 sinks current from the node 170 to the ground node 154. Accordingly, a current existing at the node 170 (e.g., I_ramp) is approximately equal to a subtraction of current sourced by the current source 402 and a current sunk by the current source 404. Because the current sourced by the current source 402 is proportional to Vin, and the current sunk by the current source 404 is proportional to Vout_sense, I_ramp is proportional to a current proportional to Vin minus a current proportional to Vout_sense.

Figure 5:
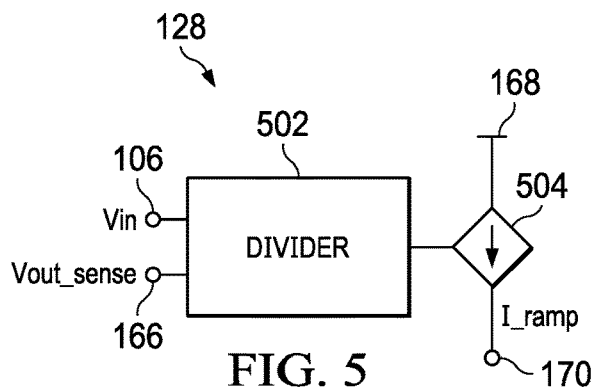
FIG. 5 is a schematic diagram of an example current sourcing circuit in accordance with various examples.

FIG. 5 shows a schematic diagram of an example current sourcing circuit 128. In at least some examples, the current sourcing circuit 128 includes a divider 502 and a current source 504. The divider 502 receives Vin and Vout_sense. An output of the divider 502 is coupled to a control input of the current source 504 and configured to provide a control signal to the current source 504. The current source 504 is coupled between the voltage supply 168 and the node 170 such that the current source 504 sources current from the voltage supply 168 to the node 170. In at least some examples, the current provided by the current source 504 is I_ramp and is proportional to the control signal provided by the divider 502.

The divider 502 is configured to perform a mathematical division utilizing Vin and Vout_sense as inputs. In at least one example, the divider 502 divides Vin by Vout_sense to provide the control signal. The control signal, in at least some examples, is provided by the divider 502 to the current source 504 to control a value of the current sourced by the current source 504 to the node 170 as I_ramp.

Figure 6:
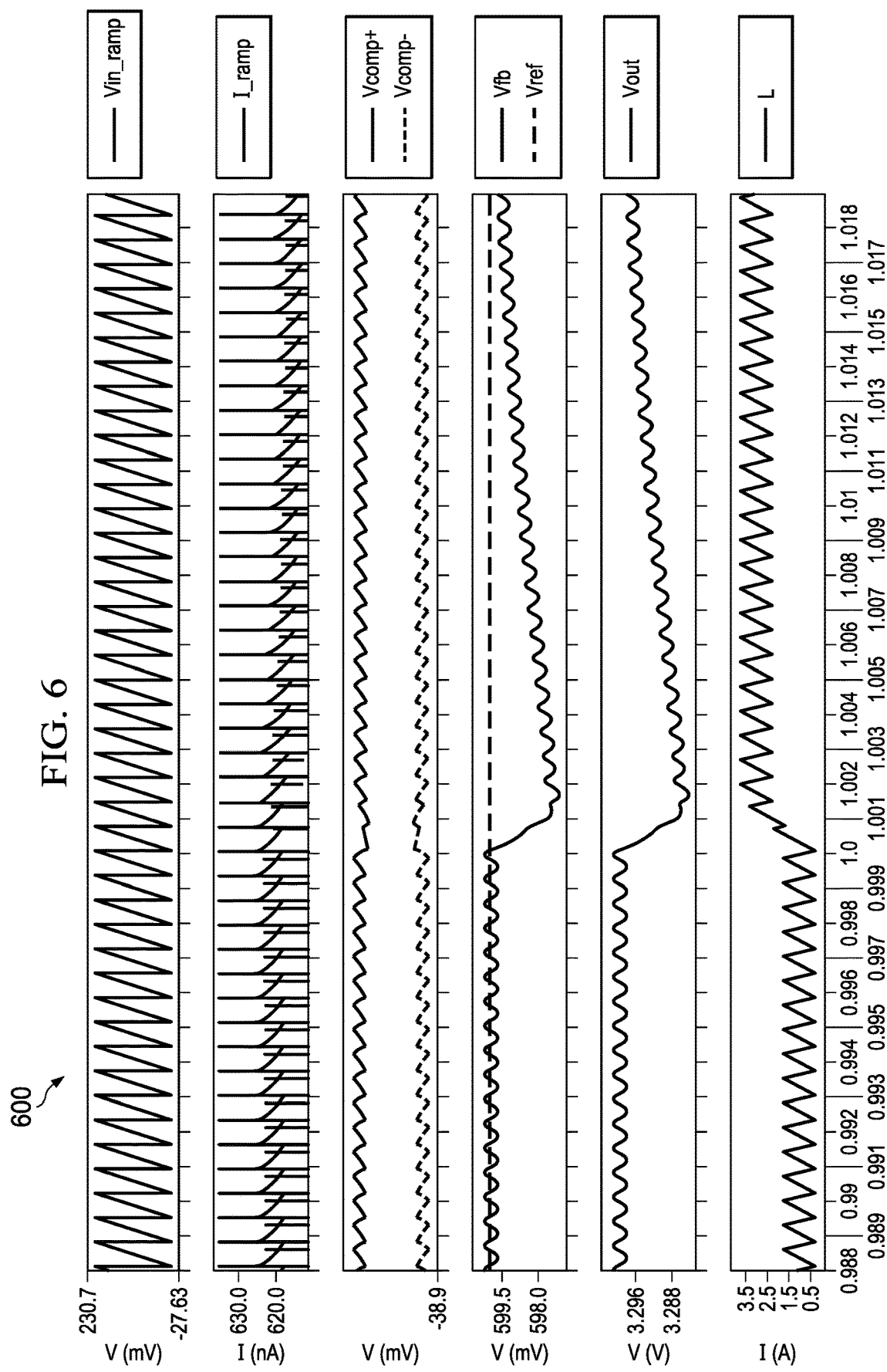
FIG. 6 is a diagram of example signal waveforms in accordance with various examples.

FIG. 6 shows a diagram 600 of example signal waveforms. In at least some examples, the signal waveforms of the diagram 600 correspond to at least some signals that exist in the SMPS 100 of FIG. 1 during at least one example of operation of the SMPS 100. Accordingly, reference may be made while describing the diagram 600 to at least some components and/or signals of FIG. 1 or any other figures described herein. The diagram 600 includes Vin_ramp, Vcomp+, Vcomp−, Vfb, Vref, and Vout along a horizontal axis representing time in units of milliseconds (ms) and a vertical axis representing voltage in units of millivolts (mV) or in the case of Vout, in units of volts (V). The diagram 600 also includes I_ramp and a current of the inductor 142, noted in the diagram as L, each along a horizontal axis representing time in units of ms and a vertical axis representing current in units of nanoamps (nA) in the case of I_ramp and in units of amps (A) in the case of L. Each of the signals shown in the diagram 600 are provided according to operations of the SMPS 100, or components thereof, described elsewhere herein and cause components of the SMPS 100 to take certain action or provide other signals also as described elsewhere herein and not repeated again here.

Figure 7:
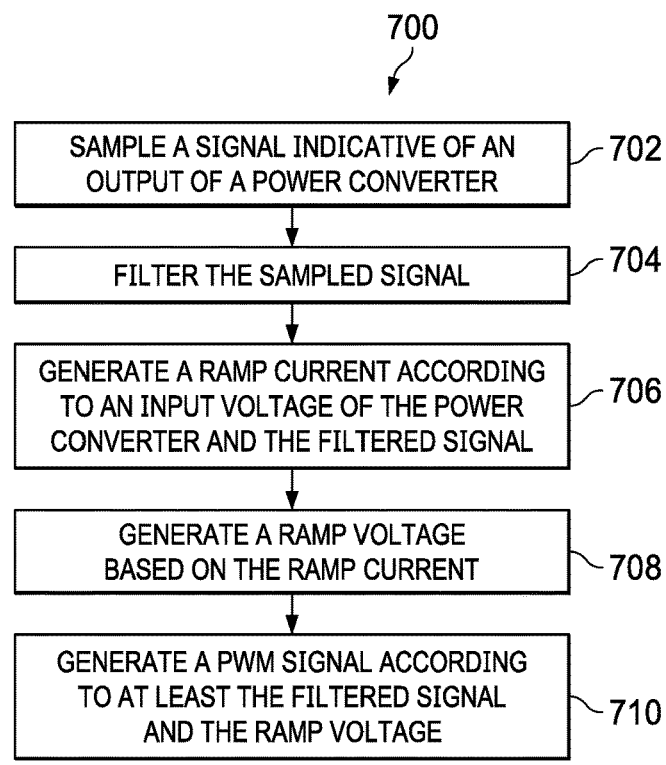
FIG. 7 is a flowchart of an example method of power converter control in accordance with various examples.

FIG. 7 shows a flowchart of an example method 700 of power converter control. In at least some examples, the method 700 is implemented in a power supply, such as the SMPS 100 of FIG. 1. Accordingly, reference may be made while describing the method 700 to at least some components and/or signals of FIG. 1 or any other figures described herein.

At operation 702, a signal indicative of an output of a power converter is sampled. In at least some examples, the signal indicative of the output of the power converter is sampled via a resistor network, such as the resistor network 124. The signal indicative of the output of the power converter is, in some examples, a signal that exists at a switch node of the power converter.

At operation 704, the sampled signal is filtered. The filtering is, in some examples, performed by a filter, such as the filter 126. In at least some examples, the filtering extracts DC information from the sampled signal and attenuates at least some high-frequency components of the sampled signal. In this regard, in at least some examples, the filtering is performed by a low-pass filter. The filtering of the sampled signal provides a filtered signal.

At operation 706, a ramp current is provided according to an input voltage of the power converter and the filtered signal. In some examples, the ramp current is provided by subtracting a current proportional to the filtered signal from a current proportional to the input voltage of the power converter. In other examples, the ramp current is provided by dividing a current proportional to the input voltage of the power converter by a current proportional to the filtered signal. In yet other examples, the ramp current is provided by modifying a signal representative of the input voltage of the power converter by the filtered signal or a signal representative of the filtered signal, and in some examples, controlling a voltage-controlled current source to provide a current based on the modified signal representative of the input voltage of the power converter.

At operation 708, a ramp voltage is provided based on the ramp current. In at least some examples, the ramp voltage is provided by charging a capacitor at a rate determined by the ramp current. A voltage of the capacitor is, in some examples, the ramp voltage. The ramp voltage is reset, in some examples, by discharging the capacitor to a ground node through a switch that is selectively opened and/or closed to enable charging and discharging the capacitor at periodic (e.g., clocked) or non-periodic intervals.

At operation 710, a PWM signal is provided according to at least the filtered signal and the ramp voltage. In some examples, the PWM signal is a control signal for controlling one or more components, such as one or more power transistors of a power converter. The PWM signal is provided, in some examples, by a comparator that receives the filtered signal and the ramp voltage as input signals. In at least some examples, the comparator is a summing comparator that also receives one or more compensation signals. If the comparator is a summing comparator that also receives compensation signals, the PWM signal is provided based on the filtered signal, the ramp voltage, and the compensation signal(s).

While the operations of the method 700 described herein have been described and labeled with numerical reference, in various examples, the method 700 includes additional operations that are not recited herein. In some examples, any one or more of the operations recited herein include one or more sub-operations. In some examples, any one or more of the operations recited herein is omitted. In some examples, any one or more of the operations recited herein is performed in an order other than that presented herein (such as in a reverse order, substantially simultaneously, overlapping, etc.). Each of these alternatives falls within the scope of this description.

In this description, the term "couple" may cover connections, communications, or signal paths that enable a functional relationship consistent with this description. For example, if device A generates or provides a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal generated or provided by device A. Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

While certain components may be described herein as being of a particular process technology, these components may be exchanged for components of other process technologies. Circuits described herein are reconfigurable to include the replaced components to provide functionality at least partially similar to functionality available before the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor. Also, uses of the phrase "ground voltage potential" in this description include a chassis ground, an Earth ground, a floating ground, a virtual ground, a digital ground, a common ground, and/or any other form of ground connection applicable to, or suitable for, the teachings of this description. Unless otherwise stated, "about", "approximately", or "substantially" preceding a value means+/−10 percent of the stated value.

Modifications are possible in the described examples, and other examples are possible, within the scope of the claims.

What is claimed is:

1. A circuit, comprising:
   a resistor network having a resistor network output, the resistor network adapted to be coupled between a switch terminal of a power converter and a ground terminal;
   a filter having a filter input and a filter output, the filter input coupled to the resistor network output;
   a current generator having a current generator output and first and second current generator inputs, the first current generator input configured to receive an input voltage and the second current generator input coupled to the filter output; and a capacitor coupled between the current generator output and the ground terminal.

2. The circuit of claim 1, wherein the current generator includes:
a first current source coupled between a voltage supply and the current generator output, wherein the first current source is configured to source an amount of current from the voltage supply to the current generator output based on a value of the input voltage; and
a second current source coupled between the current generator output and the ground terminal, wherein the second current source is configured to sink an amount of current from the current generator output to the ground terminal based on a value of a signal provided at the filter output.

3. The circuit of claim 1, wherein the current generator includes:
a divider having a divider output and first and second divider inputs, the first divider input configured to receive the input voltage and the second divider input coupled to the filter output; and
a current source coupled between a voltage supply and the current generator output, wherein the current source is configured to source an amount of current from the voltage supply to the current generator output based on a value of a signal provided at the divider output.

4. The circuit of claim 1, further comprising:
a comparator having a comparator output and first and second comparator inputs, the first comparator input coupled to the filter output, the second comparator input coupled to the current generator output, and the comparator output adapted to be coupled to a power converter; and
a switch coupled between the current generator output and the ground terminal and adapted to be coupled to an oscillator to receive and be controlled by a clock signal.

5. The circuit of claim 4, wherein the comparator has third and fourth comparator inputs, the third comparator input configured to receive a positive component of a compensation signal derived from an output of the power converter, and the fourth comparator input configured to receive a negative component of the compensation signal derived from the output of the power converter.

6. The circuit of claim 4, further comprising the power converter, wherein the power converter comprises a transistor having a gate coupled to the comparator output and a source coupled to the switch terminal.

7. The circuit of claim 6, wherein the capacitor is configured to provide a ramp voltage based on an output current of the current generator, the comparator is configured to provide a pulse-width modulation (PWM) signal based on an output signal of the filter and the ramp voltage, and the power converter is configured to switch the input voltage to the switch terminal based on a value of the PWM signal.

8. The circuit of claim 1, wherein the resistor network is configured to sample a signal that exists at the switch terminal to provide a sampled signal, the filter is configured to filter the sampled signal to extract direct current information from the sampled signal to provide a filtered signal, and the current generator is configured to provide a ramp current based on the input voltage and the filtered signal.

9. The circuit of claim 8, wherein the current generator is configured to provide the ramp current by modifying a signal representative of the input voltage according to a signal representative of the filtered signal.

10. A circuit, comprising:
a filter configured to:
receive a signal representative of an output of a power converter; and
extract direct-current information from the signal representative of the output of the power converter to provide a filtered signal;
a current generator configured to:
receive an input voltage of the power converter;
receive the filtered signal; and
provide a ramp current based on the input voltage of the power converter and the filtered signal; and
a capacitor configured to provide a ramp voltage based on charging and discharging according to the ramp current.

11. The circuit of claim 10, wherein the current generator includes:
a first current source configured to source a current based on a value of the input voltage of the power converter; and
a second current source configured to provide the ramp current by sinking a current based on a value of the filtered signal from the current sourced by the first current source.

12. The circuit of claim 10, wherein the current generator includes:
a divider configured to:
receive the input voltage of the power converter;
receive the filtered signal; and
divide the input voltage of the power converter by the filtered signal to provide a divided signal; and
a current source configured to provide the ramp current based on a value of the divided signal.

13. The circuit of claim 10, further comprising:
a comparator configured to provide a pulse-width modulation signal based on at least the filtered signal and the ramp voltage; and
a switch coupled to the capacitor and configured to discharge the capacitor periodically based on a received clock signal.

14. The circuit of claim 13, further comprising the power converter, wherein the power converter is configured to switch, based on the pulse-width modulation signal, the input voltage of the power converter to a switch terminal at which the signal representative of the output of the power converter is provided.

15. A circuit, comprising:
a battery configured to provide a battery voltage;
a filter configured to:
receive a signal representative of an output of a power converter; and
attenuate high-frequency components of the signal representative of the output of the power converter to provide a filtered signal;
a current generator configured to provide a ramp current based on the battery voltage and the filtered signal; and
a capacitor configured to provide a ramp voltage based on charging and discharging according to the ramp current.

16. The circuit of claim 15, wherein the current generator includes:
a first current source configured to source a current based on the battery voltage; and
a second current source configured to provide the ramp current by sinking a current based on a value of the filtered signal from the current sourced by the first current source.

17. The circuit of claim 15, wherein the current generator includes:
  a divider configured to:
    receive the battery voltage;
    receive the filtered signal; and
    divide the battery voltage by the filtered signal to provide a divided signal; and
  a current source configured to provide the ramp current based on a value of the divided signal.

18. The circuit of claim 15, further comprising a comparator configured to provide a pulse-width modulation signal based on at least the filtered signal and the ramp voltage.

19. The circuit of claim 18, further comprising the power converter, wherein the power converter is configured, based on a pulse-width modulation signal, to switch the battery voltage to a switch terminal at which the signal representative of the output of the power converter is provided.

20. The circuit of claim 18, wherein the comparator is configured to modify a gain ratio to change an effective slope of the ramp voltage.

\* \* \* \* \*